UNITED STATES PATENT OFFICE.

GEORGE G. MULLINS, OF LOS ANGELES, CALIFORNIA, ASSIGNOR TO THE MULLINS SILICATED IRON AND STEEL COMPANY, OF EAST ST. LOUIS, ILLINOIS.

PROCESS OF MAKING IRON CASTINGS.

SPECIFICATION forming part of Letters Patent No. 393,443, dated November 27, 1888.

Application filed April 20, 1888. Serial No. 271,318. (Specimens.)

*To all whom it may concern:*

Be it known that I, GEORGE G. MULLINS, a citizen of the United States, residing at Los Angeles, in the county of Los Angeles and State of California, have invented certain new and useful Improvements in the Process of Making Iron Castings; and I do hereby declare the following to be a full, clear, and exact description of the invention, such as will enable others skilled in the art to which it appertains to make and use the same.

The object of this invention is greatly to improve cast-iron, make superior foundry product, and to enable the founder to use mixtures of refractory and cheap irons—such as scrap, refuse scrap, and mill irons—not heretofore easily and profitably employed.

The invention relates to the regular treatment of the iron in the cupola with silica as a friend and ally, to change, purify, and strengthen and give "life" or "body" to the resultant metal. By "silica" I mean simple silica or silex ($SiO_2$) pure as it can be found in nature, in the form of silicious sand, massive sand, sandstone, when pure, quartz, crystal, and flint. The quantity of silica used in each heat I vary with the ascertained character of the iron to be used, the burden, and the blow or intensity of heat to which it may be submitted, which is determined by principle and the experience of the operator. I use of the silica from one-half of one per cent. to five per cent., in weight, of the iron charged in the heat. The general rule is to adapt the silica so as to insure that at least a small per cent. of it in the state of fusion shall come into immediate contact with the iron at a high degree of heat and consequent liquid fusion and to have just such a quantity of silica as not to scour or to clog the furnace.

In carrying out my invention I use this method: In charging the ordinary cupola there is first placed the usual bed of coke or fuel. Upon this is placed a layer of silica. Upon this is placed a layer of iron. In using a flux it is placed upon the top of the iron. The sequence of coke, silica, iron, and flux is repeated until the cupola is fully charged. After the cupola is thus charged the manipulation proceeds in the usual manner, well known to those skilled in the manufacture of iron. These are the salient features of the process. Many details may be varied.

The silica may be placed in as loose or lump sand, quartz, &c.; but to obtain highly beneficial results with loose sand I prefer to place it in carriers—such as balls of clay, pieces of pipe, &c.; also, it is preferable to have the silica distributed over the layer of coke, but for the most part near the center. Even in arranging the layers it is not absolutely essential that the silica should be below the iron, though such is vastly preferable. When the heat ascends and the silica is fused, the iron, requiring less heat than the silica, is also fused, and running down, commingles with the silica. The silica and iron being thus at the point of fusion become fused together, combining to form a silicated iron, the silica becoming thus an ally to the iron. After the product is run from the cupola, it is run direct into the molds or chills.

The product is wonderfully homogeneous, rather fine-grained, dark gray, and of bright metallic luster. It is free from blow-holes and not honeycombed. It is very strong and tough, yet is soft, and can be easily bored or drilled, and it chips well under the chisel.

I wish it to be distinctly understood that I do not limit myself to any special arrangement of or way of placing the silica in the cupola.

I regard myself as the discoverer of the principle that silica, when properly united with iron in a cupola, produces a result not obtainable hitherto by any other process.

Having described my invention, what I claim is—

1. The process for making silicated iron castings, which consists in charging a cupola with layers of silica, iron, and fuel arranged in sets, then manipulating the charge in the usual way, as set forth.

2. The process for making silicated iron castings, which consists in charging a cupola with a layer of fuel, a layer of silica, a layer of iron, and a layer of flux, then repeating these layers in the same order until the cupola is charged, then manipulating the charge in the usual way, as set forth.

In testimony whereof I affix my signature in presence of two witnesses.

GEORGE G. MULLINS.

Witnesses:
 JOHN C. FILL,
 S. A. TERRY.